United States Patent [19]

Oliver et al.

[11] 3,924,082

[45] Dec. 2, 1975

[54] CONFERENCE CIRCUITS FOR USE IN TELECOMMUNICATIONS SYSTEMS

[75] Inventors: Stephen Edward Oliver, Rugby; Nicholas Richard Winch, Coventry, both of England

[73] Assignee: The General Electric Company Limited, London, England

[22] Filed: Feb. 4, 1974

[21] Appl. No.: 439,627

[30] Foreign Application Priority Data

Feb. 5, 1973 United Kingdom................. 5575/73

[52] U.S. Cl......... 179/18 BC; 179/1 CN; 179/2 DP

[51] Int. Cl.²........................................... H04M 3/56

[58] Field of Search............ 179/18 BC, 1 CN, 2 DP

[56] References Cited

UNITED STATES PATENTS

| | | | |
|---|---|---|---|
| 3,364,309 | 1/1968 | Horner | 179/1 CN |
| 3,428,754 | 2/1969 | Hoyler | 179/18 BC |
| 3,530,246 | 9/1970 | Kelly et al. | 179/1 CN |
| 3,551,600 | 12/1970 | Berch | 179/18 BC |
| 3,604,855 | 9/1971 | Pommerewing | 179/18 BC |

*Primary Examiner*—Kathleen Claffy
*Assistant Examiner*—C. T. Bartz
*Attorney, Agent, or Firm*—Kirschstein, Kirschstein, Ottinger & Frank

[57] ABSTRACT

A conference circuit for use in a PCM system. 'n' channels requiring conference are arranged serially in *n*-channel frames.

Each frame of *n* channels is sampled by transfer to an *n*-stage cyclic shift register and circulated through the register once. *n*-1 of the shift register stages are permanently added to give every possible combination of *n*-1 of the *n* channels in a frame as the *n* channels circulate through the register. Each such combination of *n*-1 channels is then clearly the conference signal required by the remaining channel subscriber. The various combinations of *n*-1 channels are then simply distributed to the appropriate 'remaining' channel subscribers.

6 Claims, 4 Drawing Figures

CONFERENCE CIRCUITS FOR USE IN TELECOMMUNICATIONS SYSTEMS

This invention relates to conference circuits for use in telecommunications systems.

In a telecommunications system, the operation of connecting more than two parties together in a single call is known as conferencing, and a circuit for performing such an operation within an exchange or other switching centre is referred to herein as a "conference circuit." The function of such a conference circuit is therefore to feed to each conferring party the sum of the speech signals from all the other conferring parties, but not his own speech signal, since this would give rise to undesirable "side tone" effects.

One object of the present invention is to provide a novel form of conference circuit.

According to the invention, a conference circuit for use in a telecommunications system comprises: a cyclic shift register having more than two stages each of which stages can hold a digital data word; means for clocking said shift register at a predetermined clock rate; means for writing digital data words from more than two input channels into respective stages of said shift register, at one point in each cycle of said register; digital adding means coupled to a predetermined combination of said stages of said register, being one fewer than the total number of said stages, for adding together the contents of said combination of stages so as to produce a digital output word each time the shift register is clocked; and means for feeding the output words produced in each cycle of the shift register to respective output channels, whereby each output channel receives the sum of the data words from all but a corresponding one of the input channels.

It will be appreciated that since this conference circuit performs the required conferencing operation using digital techniques, it finds primary application in digital telecommunications systems. However, the circuit might also be used in an analogue system, if suitable analogue-to-digital and digital-to-analogue converters were provided at the input and output channels.

In a particular form of the invention, said input channels are time-division multiplexed together, and said means for writing digital data words into said cyclic shift register comprises: a linear shift register having more than two stages each of which stages can hold a digital data word; means for clocking said linear shift register in synchronism with the multiplexing rate of said input channels, so as to cause successive data words appearing on said input channels to be read respectively into successive stages of said linear shift register; and means for transferring the contents of at least some of the stages of said linear shift register into respective stages of said cyclic shift register, at one point in each cycle of the latter register.

Conveniently, said cyclic shift register comprises two sections, one of which can be effectively removed from service so as to permit the contents of the other section to circulate within that other section alone, thereby effectively reducing the number of stages of said cyclic shift register, and said adding means is coupled to a predetermined combination of stages of said other section, being one fewer than the total number of stages of that other section. This provides the facility for varying the number of conferring parties, and the number of conference calls, that can be handled simultaneously by the conference circuit, as will become apparent from the description of the preferred embodiment to be given below.

In a digital telecommunications system, data is conventionally encoded in the form of a binary number consisting of a sign bit plus $m$ magnitude bits. Conveniently, these numbers are converted in the conference circuit, before being fed to the adding means, into $2^m$ complement form wherein each word is represented by an $(m+1)$ bit number with no sign bit, this $(m+1)$ bit number being equal to the original number plus $2^m$. This converts the data into all-positive form, and thus greatly facilitates the operation of the adding means. Typically, then, each output word appearing from the adding means will consist of an $n$- bit number in $2^{n-1}$ complement form ($n$ being larger than $m+1$ because the output word is the sum of a plurality of input words), and conveniently the conference circuit will comprise a decomplementation circuit for converting these output words back into the form of a sign bit plus a plurality of magnitude bits, before they are fed to the output channels.

It will be appreciated that, because each output word is the sum of a plurality of input words, the output of the adding means has a larger dynamic range than that of any of the input channels. Preferably, therefore, the conference circuit is arranged to clip the output words from the adding circuit, so as to reduce the dynamic range of the signals fed to the output channels. If, for example, it is required to restrict the dynamic range of the output channels to the equivalent of $m$ magnitude bits, it is necessary to detect and clip any output word which falls outside the range $2^{n-1} \pm (2^m - 1)$, this being the equivalent, in $2^{n-1}$ complement form, of $\pm(2^m - 1)$. Thus, preferably, the conference circuit comprises out-of-limit detection means for producing an out-of-limit signal in respect of each said output word which lies outside the range $2^{n-1} \pm (2^m - 1)$, and means for applying the maximum possible magnitude bits to the output channel corresponding to such an output word.

In a preferred form of the invention, said decomplementation circuit is arranged to receive $n$ -bit output words from said adding means, in $2^{n-1}$ complement form and to convert each such word into an $(m+1)$ bit word consisting of a sign bit plus $m$ magnitude bits, the decomplementation circuit comprising: an $m$ -bit adder having two $m$ -bit inputs and an $(m+1)$ bit output; means for applying the $m$ least significant bits of each $n$ -bit output word to one $m$ -bit input of the adder, without change if the most significant bit of the $n$-bit output word is 1 and with each bit inverted if the most significant bit on the $n$-bit output word is 0, and means for applying the inverse of the most-significant bit of the $n$-bit output word to the least significant bit of the other $m$-bit input of said adder, so as to cause unity to be added to the $m$ bits applied to the first-mentioned input of the adder if the most-significant bit of the $n$-bit output word is 0.

It can be shown that, providing the $n$-bit output word lies within the prescribed limits $2^{n-1} \pm (2^m - 1)$, the $m$ least significant bits in the output of the $m$-bit adder will represent the required $m$ magnitude bits, and the most significant bit of the $n$-bit output number provides the required sign bit.

Preferably, said out-of-limit detection circuit comprises logic gating means for producing said out-of-limit signal in the event that either:

i. the most significant bit of said n-bit output word is 1 and any one or more of the $(n-m-1)$ next most significant bits is equal to 1; or ii. the most significant bit of said $n$-bit output word is 0 and at least one of the $n-m-1$) next most significant bit is equal to 0, or iii. the most significant bit of the output of the $m$-bit adder is equal to 1.

It can be shown that this logic circuit provides the out-of-limit signal whenever an output word falls outside of the prescribed limits, using only substantially a minimum of logic elements.

One conference circuit in accordance with the invention will now be described, by way of example, with reference to the accompanying drawings, of which:

Figure 1:
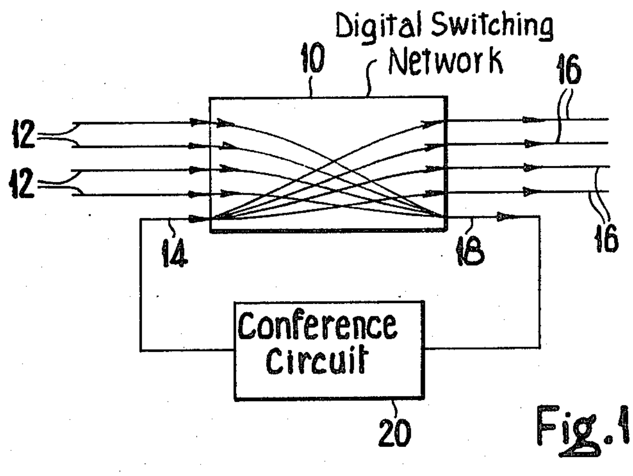
FIG. 1 is a schematic block diagram of a digital telecommunications switching system, including a conference circuit.

Referring to FIG. 1, this shows a digital switching network 10 having a plurality of signal input paths 12, 14 and a plurality of signal output paths 16, 18. In operation, each of the paths 12–18 carries a 32-channel time-division multiplexed (T.D.M.) pulse-code-modulated (P.C.M.) signal. The switching network 10 is selectably operable to connect any of the channels on any of the input paths 12, 14 to any of the channels on any of the output paths 16, 18.

The switching network 10 will not be described in detail, since such networks are well known in the art, and in any case the switching network 10 is not a part of the present invention. Typically, however, the network 10 may comprise a combination of time switches, for changing the time-slots of the T.D.M. channels, and space switches, for interconnecting the signal paths. One such network is described in our co-pending U.K. patent application No.52446/72.

One of the 32-channel output paths, 18, is connected to the input of a digital conference circuit 20, the output of which is connected to one of the 32-channel input paths, 14. As will be described below in greater detail, the conference circuit 20 has two modes of operation. In a first mode, it divides the 32 PCM channels on the path 18 into four groups of eight channels each, and interconnects the eight channels in each group so as to form four conferences, each with eight participants. In a second mode, the conference circuit forms eight conferences, each with four participants.

A conference can therefore be established as follows. Each input channel which is to be part of the conference is connected through the switching network 10 to one of the channels on the path 18 connected to the input of the conference circuit. In addition, each of the channels on the path 14 from the output of the conference circuit is connected by way of the switching network 10 to the appropriate output channel on one of paths 16. Thus, the network 10 is used to gather together all the input channels on the paths 12 which are to participate in the conference, and to connect them to the appropriate channels on the path 18 connected to the conference circuit. The network 10 then distributes the conferenced signals appearing on the path 14 to the appropriate output channels on the paths 16.

As mentioned above, each of the paths 12–18 carries a 32-channel TDM signal. Such a signal has a recurring time frame consisting of 32 time slots, each time slot containing an eight-bit data word. The signals on the paths 12–18 are transmitted in serial form, at a bit rate of 2.048 megabits per second. Each eight-bit data word comprises a sign bit followed by seven magnitude bits, and represents the instantaneous value of the amplitude of the speech signal being transmitted by that channel, encoded in a known logarithmically compressed form, as described in British Post Office Specification RC 5549. Furthermore, the eight bits in each time slot are subjected to alternate digit inversion in the conventional manner: that is to say, every alternate bit is inverted so as to be the inverse of its true value.

Figure 2:
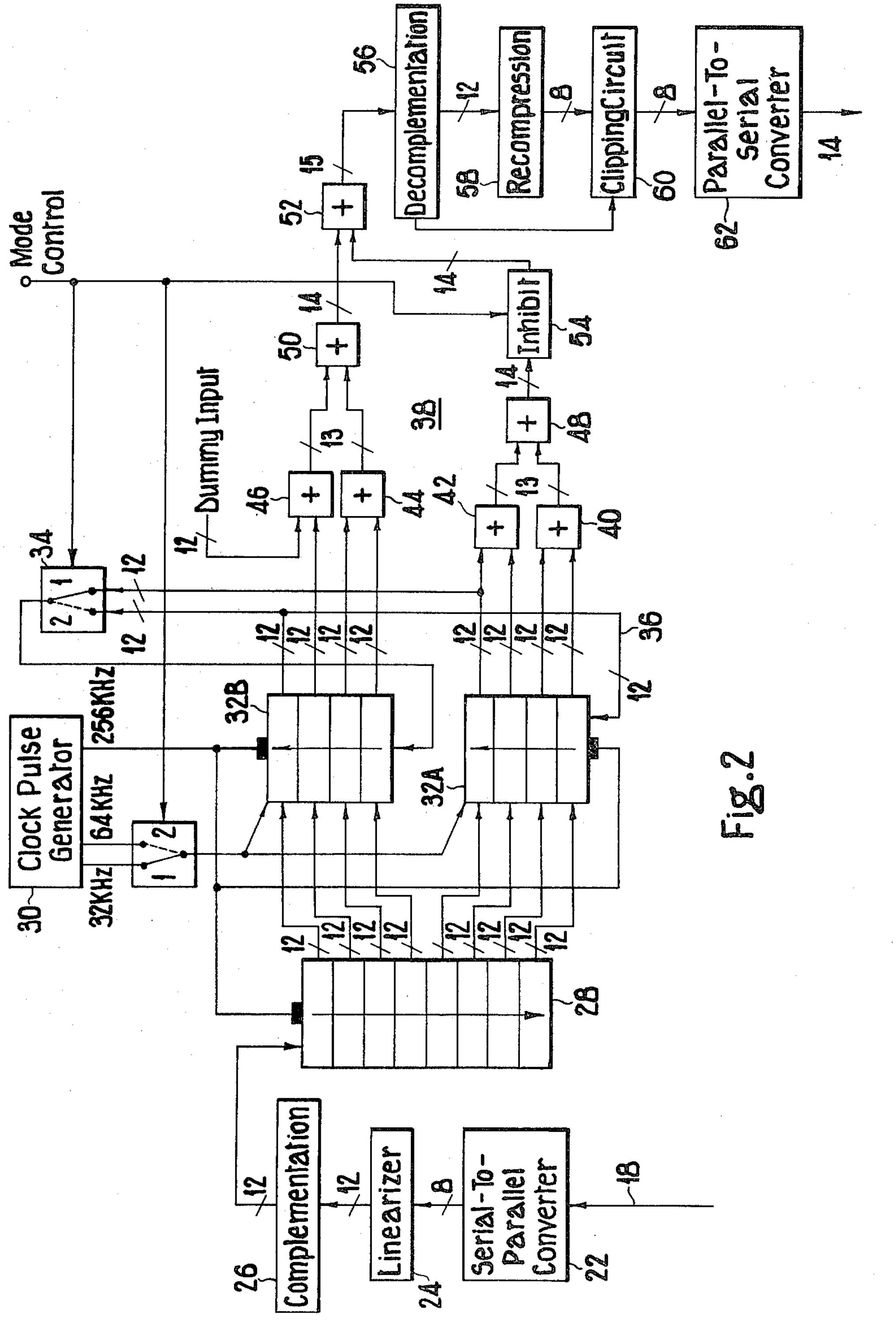
FIG. 2 is a more detailed schematic block diagram of a conference circuit in accordance with the invention.

Referring now to FIG. 2, this shows the conference circuit 20 of FIG. 1 in greater detail.

The 32-channel TDM signal from the path 18 is applied to a serial-to-parallel converter 22, having an eight-wire output on which the eight-bit data words from the 32 channels appear in succession, in parallel form, at a rate of 256 kilobits per second. The converter 22 also acts to remove the alternate-digit inversion present on the incoming signal.

The output from the converter 22 is fed to a digital linearizer circuit 24 which converts each eight-bit logarithmically compressed data word into a twelve-bit expanded word, consisting of a sign bit followed by eleven magnitude bits. Ideally, the transfer characteristic of the linearizer is the exact inverse of the characteristic of the analog-to-digital PCM encoder that was used to originally encode the speech signals, so that the output of the linearizer bears a linear relationship to the amplitude of the original speech signal. This logarithmic-to-linear conversion is necessary because a plurality of the data words from different channels are to be added together, as will be described below.

The serial-to-parallel converter 22 and the linearizer 24 have not been described in detail, since these are well-known items of equipment, and may be of conventional form.

In order to facilitate the addition just referred to and to be described below, the twelve-bit data words from the linearizer are converted into so-called $2^{11}$ complement representation. In this form of representation, $2^{11} = 2048$ is effectively added to each data word, so as to make every word positive. Assuming that the sign-bit convention is such that 1 signifies a positive number, the conversion of a twelve-bit word consisting of a sign bit followed by eleven magnitude bits to $2^{11}$ complement representation can conveniently be effected as follows. If the sign bit is 1, no action is taken, the sign bit merely being regarded as the most-significant bit of the 12-bit word. If on the other hand the sign bit is 0, each of the eleven magnitude bits is inverted, and unity is added to the resulting number.

For example, the number +1092 (sign bit = 1, magnitude bits = 10001000100) will be represented by 2048 + 1092 = 3140 (110001000100) in $2^{11}$ complement form, while the number -1092 (sign bit =0, magnitude bits = 10001000100) will be represented by 2048−1092=956 (001110111100).

In the conference bridge shown in FIG. 2, the inversion of the eleven magnitude bits is performed, where necessary, by a complementation circuit 26, while the addition of unity is performed, when required, at a later stage, as will be described.

Figure 3:
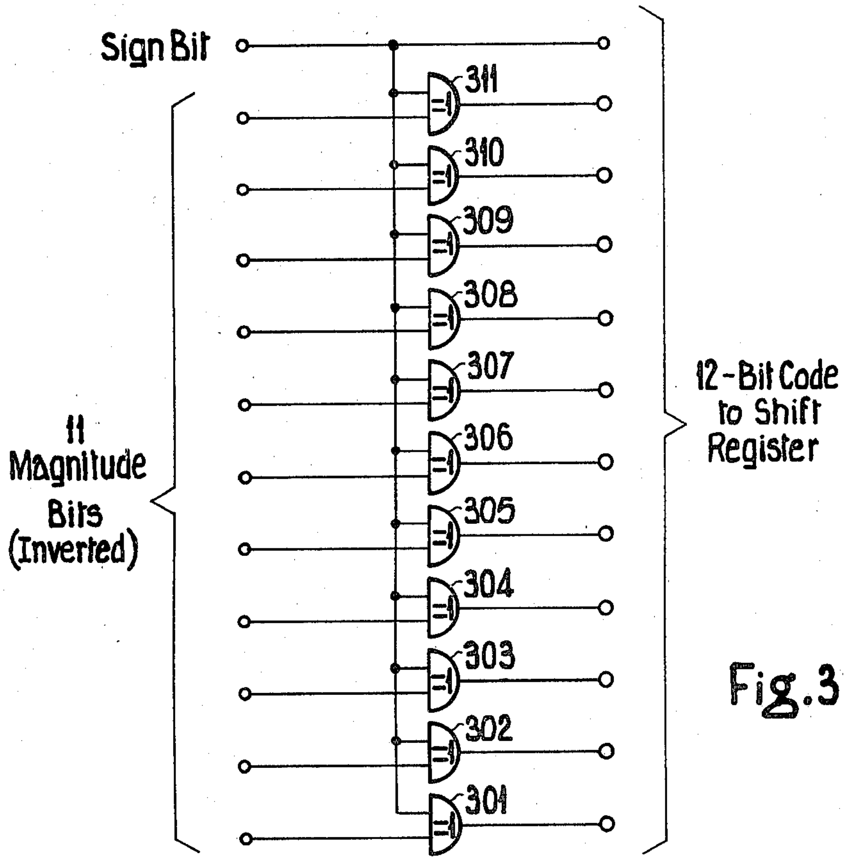
FIGS. 3 and 4 are circuit diagrams of particular portions of the circuit of FIG. 2.

FIG. 3 shows the complementation circuit 26 in greater detail. The circuit 26 has twelve input terminals to which are respectively applied the eleven magnitude bits (in inverted form) and the sign bit (not inverted), from the linearizer. The circuit 26 comprises eleven two-input exclusive -OR gates 301–311. One input of each exclusive -OR gate is fed with the sign bit from the appropriate input terminal, while the other inputs of the gates 301–311 are respectively fed with the inverted magnitude bits from the other eleven input terminals. Consideration of the circuit will show that, when the sign bit is O, the inverted magnitude bits will be passed unaltered by the gates 301–311, whereas when the sign bit is 1, the gates will reinvert the magnitude bits to their original form. The magnitude bits (inverted or unaltered as the case may be) and the sign bit appear at respective output terminals.

Referring back to FIG. 2, the 12-bit words appearing at the output of the complementation circuit 26 are fed to the input of an eight-stage linear shift register 28 each stage of which holds one 12-bit data word. A 256 kilohertz clock signal is applied to the shift-clock input of this shift register, from a clock-pulse generating unit 30, causing the data in the register to be shifted in parallel through the register stages in synchronism with the channel rate of the TDM signal. Thus, successive data words appearing at the output of the complementor circuit 26 are written into the first word of the shift register 28 and shifted through its stages successively. There is no serial output from this register 28 so that the 12-bit words are lost as they are stepped out of the lowermost stage. They are, however, processed in parallel as they pass through the register. This will be explained.

The conference circuit also includes an eight-stage twelve-bit shift register 32, which is also clocked by the 256 kilohertz clock signal from the generating unit 30. The register 32 is divided into two sections 32A and 32B each of four stages. In a first mode of operation of the conference circuit, the output of the first of these sections is connected to the input of the second by way of a data selector 34. In this mode, therefore, all eight stages are coupled in series, and data in the register circulates in a loop through all eight stages, being fed back from the last stage of the register to the first stage by way of a 12-wire path 36. In a second mode of operation, the data selector 34 is operated so as to disconnect the two sections 32A and 32B, and to connect the output of the last stage of the second section 32B back to the input of that section. In this mode, therefore, the first section 32A is effectively removed from service, and data circulates in a loop through the four stages of section 32B only. In summary, therefore, the register 32 acts, in the first mode half of it acts, as an eight-stage cyclic shift register, and the other half, 32A, is redundant, and in the second mode as a four-stage cyclic shift register.

The contents of the eight stages of the linear shift register 28 are read, in parallel, into the respective stages of the cyclic shift register 32 by means of gating pulses applied to the gating inputs of the shift register 32 from the clock-pulse generating unit 30. In the first mode of operation, these gating pulses are applied at a frequency of 32 kilohertz, whereas in the second mode these gating pulses are applied at a frequency of 64 kilohertz.

The effect of this low gating frequency in comparison with the higher stepping frequency (256 kHz) through the two registers 28 and 32 is that, in the first mode, for each group or batch of eight new data words which are clocked (serially) into the register 28, a gating pulse, i.e. a 'write' pulse, transfers, or rather, copies all eight into the register 32 in parallel. While the originals of these eight words in register 28 are then clocked out to waste, the copies in register 32 are processed for the conference requirement. There are thus eight 256 kHz clock pulse periods available for this conference processing of the eight copies. There is thus time between each such transfer operation of data words from register 28 to register 32 to circulate the eight data words in register 32 if they are stepped (which they are) at the same rate, 256 kHz, as the data words in register 28. As mentioned above, this circulation is achieved, in the first mode, from the uppermost stage of register 32B along path 36 to the lowermost stage of register 32A. The connection between the portions 32A and 32B of the register 32 is then achieved by the data selector 34 in its 'mode 1' connection. The circulation of each eight data words is just completed once before they are over-written by the transfer of the next eight data words from register 28.

There is thus a repeated transfer of eight data words from register 28, a circulation of these eight data words in register 32 and a transfer of the next incoming eight words, and so on.

At each of the eight steps of the circulation of the eight data words, the contents of seven of the eight stages of the cyclic shift register 32 (i.e., all four stages of the first section 32A, and the first three stages of the second section 32B) are presented in parallel to seven inputs of an eight input binary addition unit 38, the eighth input of which is fed by a dummy input number, 2048 in binary form, this being the equivalent of zero in $2^{11}$ complement representation. The addition unit comprises seven parallel binary adders 40–52 arranged in three ranks, the first rank comprising four 12-bit adders 40–46, the second rank comprising two 13-bit adders 48, 50, and the third rank comprising a 14-bit adder 52. In the first mode of operation, all of these adders are used, so as to sum all eight inputs presented to the addition unit. In the second mode of operation, however, an inhibit unit 54 is operated, so as to effectively disconnect the output of adder 48 from the input of adder 52 and to apply instead the complement representation of zero (i.e., $2^{13}$ in binary form) to the adder 52. The inhibit unit 54 basically comprises a set of AND gates, controlled by the mode control signal. Thus, in the second mode, the addition unit will sum only the contents of the first three stages of the second section 32B of the register 32, and the dummy input.

The operation of the conference circuit is therefore as follows.

In the first mode of operation, the contents of the linear shift register 28 are read into the cyclic shift register by means of the 32 kilohertz gating pulses, i.e., after every eight data words and thus four times in each time frame of the TDM signal. Thus, the linear shift register 28 acts to collect the contents of a complete quarter time frame of the TDM signal (i.e., channels 0–7, 8–15, 16–23, or 24–31) and then to transfer this quarter frame in parallel to the cyclic shift register 32. While the next quarter frame is being collected in the linear shift register 28, the eight data words transferred to the cyclic shift register 32 are circulated, being stepped one stage forward at each 256 kilohertz clock pulse. At each clock pulse, seven out of the eight data words are presented to the addition unit for summation, and by the time the next quarter frame has been completely collected in the linear shift register 28, all eight combinations of seven out of eight words in the cyclic shift register have been presented to the addition unit. Thus, in each quarter frame, eight 15-bit data words appear in turn at the output of the addition unit, constituting eight TDM output channels. Each of these output channels contains the sum of the signals from all but one of the input channels in that quarter frame. It will be seen that in this first mode of operation, the 32 input channels are grouped into four eight-party conferences.

In the second mode of operation, the contents of the linear shift register 28 are read into the cyclic shift register 32 by means of the 64 kilohertz gating pulses, eight times in each frame of the TDM signal. Thus, the linear shift register 28 acts to collect the contents of a complete one-eighth frame (i.e. channels 0–3, 4–7, 8–11, 12–15, 16–19, 20–23, 24–27, or 28–31) and then to transfer this one-eighth frame in parallel to the second section 32B of the cyclic shift register. While the next one-eighth frame is being clocked into the linear shift register, the four data words in section 32B circulate in synchronism with the 256 kilohertz clock. At each clock pulse, three out of the four data words are presented to the addition unit for summation, and by the time the next one-eighth frame has been collected by the linear shift register 28 all four combinations of three out of the four words in the section 32B have been presented to the addition unit. In consequence, it will be seen that in this second mode of operation the 32 input channels are grouped into eight four-party conferences.

Referring still to FIG. 2, each of the seven adders 40–52 has a single-bit "carry" input C in addition to its two main inputs. These inputs are "spare" in the sense that they are not required for the purpose of adding the contents of the cyclic shift register 32, and are present as a result of the fact that the adders are constructed from standard integrated-circuit modules. These spare inputs C are utilised to perform the addition of unity in respect of each data word of negative sign, so as to complete the conversion of the data words to $2^{11}$ complement form. (It will be recalled that part of this conversion has already been performed by the complementation circuit 26). Thus, the most-significant bits of the outputs from the first seven stages of the shift register 32 are inverted, and applied to the carry inputs C of the adders 40, 48, 42, 52, 44, 50 and 46 respectively. This results in the addition of unity to the total output of the addition unit in respect of each input data word whose sign bit is "0". It will be seen that utilisation of the spare "carry" inputs C in this manner results in an economy in the circuitry required, since it obviates the need for a separate adder to perform the required addition of unity.

Because of dynamic-range doubling at successive ranks of the addition unit 38, the output of the addition unit consists of fifteen bits and is in $2^{14}$ complement form. Before this output is applied back to the digital switching network, the following operations must be performed on it.

a. It must be reconverted into decomplemented form (i.e., sign bit followed by magnitude bits).

b. It must be converted back into logarithmically compressed form, consisting of a sign bit followed by seven magnitude bits.

c. It must be "clipped" so as to limit its dynamic range to that of the original TDM signal. This "clipping" involves recognising each data word from the addition unit that represents a number falling outside the limits $\pm(2^{11}-1) = \pm 2047$ (corresponding to the dynamic range of the original TDM signal), and setting the corresponding seven-bit logarithmically compressed code to its maximum possible value (i.e., seven binary ones). Expressed in $2^{14}$ complement form, these limits are equal to $2^{14} - 2047 = 18431$ and $2^{14} - 2047 = 14337$.

Figure 4:
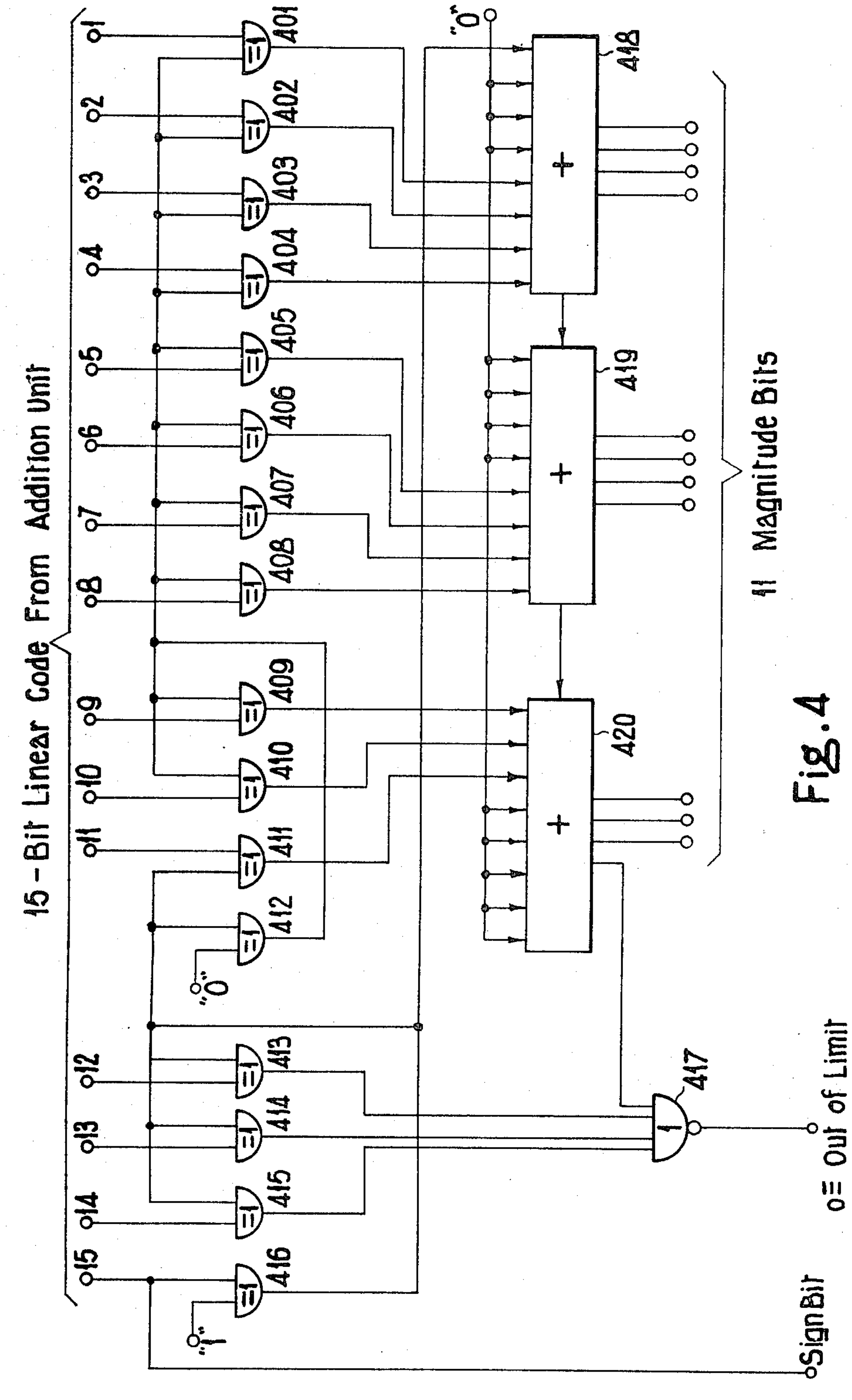

The conversion to decomplemented form is effected by decomplementation circuit 56 which is shown in greater detail in FIG. 4. This circuit receives each fifteen -bit output data word from the addition unit 38, and converts it into a twelve-bit word, consisting of a sign bit followed by eleven magnitude bits, as follows:

a. If bit 15 (the most-significant bit) of the fifteen-bit output word is equal to binary 1, the sign bit is set to 1 (signifying a positive number) and the eleven magnitude bits are set equal to bits 1—11 (the eleven least-significant bits) of the fifteen -bit word.

b. If bit 15 is equal to 0, the sign bit is set to 0 (signifying a negative number), and the eleven magnitude bits are set equal to the inverse of bits 1–11, plus unity. Referring to FIG. 4, the inversion of bits 1–11 is performed, where necessary, by means of eleven exclusive -OR gates 401–411, which are controlled by bit 15, by way of gates 412 and 416. The addition of unit is performed, where necessary, by means of a parallel binary adder, consisting of three four-bit integrated-circuit adder modules 418–420, coupled together in series. One parallel input of this adder is fed with the bits 1–11 (inverted or not as the case may be) from the gates 401–411, while the least significant bit of the other input is fed with the inverse of bit 15 from gate 416, the other bits of this input being fed with a 0. The sign bit is derived directly from bit 15.

The decomplementation circuit 56 also serves to detect those fifteen-bit data words from the addition unit which fall outside the prescribed limits 14337 to 18431 referred to above.

Examination of the binary codes for 14337 and 18431 shows that the logical functions $$\text{OVER LIMIT} = \text{bit } \mathbf{15}.\ (\text{bit } \mathbf{14} + \text{bit } \mathbf{13} + \text{bit } \mathbf{12})$$

$$\text{UNDER LIMIT} = \overline{\text{bit } \mathbf{15}}.\ (\overline{\text{bit } \mathbf{14}.\ \text{bit } \mathbf{13}.\ \text{bit } \mathbf{12}})$$

are valid for all cases except 14336, which is just under limit but does not satisfy the second of these functions. However, 14336 is the only case which causes an "overflow" output from the most-significant bit of the output of the adder 418–420 in FIG. 4. Thus, the exact out-of-limit criterion can be expressed by the logical function:

$$\text{OUT OF LIMIT} = \text{bit } \mathbf{15}.\ (\text{bit } \mathbf{14} + \text{bit } \mathbf{13} + \text{bit } \mathbf{12}) + \overline{\text{bit } \mathbf{15}}.\ (\overline{\text{bit } \mathbf{14}.\ \text{bit } \mathbf{13}.\ \text{bit } \mathbf{12}}) + \text{overflow from adder.}$$

Referring still to FIG. 4, this logical function is realised by the exclusive -OR gates 413–416, and the NOR gate 417. Thus, a 0 appears at the output of NOR gate 417 whenever a fifteen-bit data word falls outside the prescribed limits, this ouput being 1 otherwise.

Referring back to FIG. 2, the sign bit and eleven magnitude bits from the decomplementation circuit 56 are applied to a digital recompression circuit 58 which converts each of these 12-bit words into an eight-bit word consisting of a sign bit followed by seven magnitude bits, coded in logarithmically compressed form. The action of the circuit 58 is, in fact, the exact inverse of that of the lineariser 24, and will likewise not be described in detail.

The output of the recompression circuit is passed through a clipping circuit 60. The clipping circuit 60 comprises a set of gates to which the seven magnitude bits are respectively applied, these gates being controlled by the "out-of-limit" signal from the decomplementation circuit 56. The gates are such that, when the "out-of-limit" signal is 1, indicating that the data word is not out-of-limits, the seven magnitude bits are passed unaltered. If, however, the "out-of-limit" signal is 0, the seven magnitude bits from the recompression circuit are suppressed, and replaced by a word consisting of seven binary 1 s. This results in the required clipping as described above. The sign bit is, of course, unaffected by the clipping circuit.

The clipping circuit 60 also serves to restore the alternate-digit-inversion of the original signal, and finally the signal is converted back into serial form by means of a parallel-to-serial converter 62. The output of the converter 62 is thus a 32-channel TDM signal, in serial form with a bit rate of 2.048 Megabits per second, and is therefore in suitable form for applying to the input path 14 of the digital switching system, as described above, for redistribution of the conferenced signals to the respective conference parties on output paths 16.

We claim:

1. A conference circuit for use in a telecommunication system, said circuit comprising: a cyclic shift register having more than two stages each of which stages can hold a digital data word; means for clocking said shift register at a predetermined clock rate; means for writing digital data words from more than two input channels into respective stages of said shift register, at one point in each cycle of said register; digital adding means coupled to all but one of said stages of said register, for adding together the contents of the stages coupled thereto so as to produce a digital output word each time the shift register is clocked, said digital output word thus being a conference word for transmission to a conferee associated with the data word temporarily occupying said one of said stages at the particular said time, which data word was not included in the adding process at the particular said time; and a plurality of output channels for respective conferees, and corresponding to the successive states of said shift register in a said cycle, each said output channel receiving a respective said digital output word in the corresponding state of said shift register, whereby each output channel receives the sum of the data words from all but a corresponding one of the input channels.

2. A conference circuit according to claim 1, for use in a telecommunication system in which said input channels are time-division multiplexed together, and wherein said means for writing digital data words into said cyclic shift register comprises: a linear shift register having more than two stages each of which stages can hold a digital data word; means for clocking said linear shift register in synchronism with the multiplexing rate of said input channels, so as to cause successive data words appearing on said input channels to be read respectively into successive stages of said linear shift register; and means for transferring the contents of at least some of the stages of said linear shift register into respective stages of said cyclic shift register, at one point in each cycle of the latter register.

3. A conference circuit according to claim 1, wherein said cyclic shift register comprises two sections and the circuit includes means for short circuiting one of said two sections so as to permit the contents of the other section to circulate within that other section alone, and means for connecting said adding means to all but one of the stages of said other section.

4. A conference circuit according to claim 1, wherein each output word from said adding means comprises $n$ bits in $2^{n-1}$ complement form, $n$ being greater than the number, $m$, of bits in each input word entered into said cyclic register, the conference circuit including out-of-limit detection means for producing an out-of-limit signal with respect to each said output word which lies outside the range $2^{n-1} \pm (2^m-1)$, and means responsive to said out-of-limit signal for applying the maximum possible magnitude bits to the output channel in place of such an out-of-limit output word.

5. A conference circuit according to claim 1, wherein each output word from said adding means comprises n bits in $2^{n-1}$ complement form, $n$ being greater than the number, $m$, of bits in each input word entered into said cyclic register, the conference circuit including a decomplementation circuit connected to receive $n$-bit output words from said adding means in $2^{n-1}$ complement form, and to convert each such word into an $(m + 1)$ bit word consisting of a sign bit plus $m$ magnitude bits, the decomplementation circuit comprising: an $m$-bit adder having two $m$-bit inputs and an $(m+1)$ bit output; means for applying the $m$ least significant bits of each $n$-bit output word to one $m$-bit input of the adder, without change if the most significant bit of the $n$-bit output word is 1 and with each bit inverted if the most significant bit of the $n$-bit output word is 0, and means for applying the inverse of the most-significant bit of the $n$-bit output word to the least significant bit of the other $m$-bit input of said adder, so as to cause unity to be added to the $m$ bits applied to the first-mentioned input of the adder if the most-significant bit of the $n$-bit output word is 0.

6. A conference circuit according to claim 5, wherein said out-of-limit detection means comprises logic gating means for producing said out-of-limit signal in the event that either:

i. the most significant bit of said $n$-bit output word is 1 and any one or more of the $(n-m-1)$ next most significant bits is equal to 1; or ii. the most significant bit of said $n$-bit output word is 0 and at least one of the $(n-m-1)$ next most significant bits is equal to 0, or iii. the most significant bit of the output of the $m$-bit adder is equal to 1.

* * * * *